United States Patent
Chan (10) Patent No.: US 10,164,455 B2
(45) Date of Patent: Dec. 25, 2018

(54) CHARGING MANAGEMENT APPARATUS, CHARGING APPARATUS, AND CHARGING MANAGEMENT METHOD

(71) Applicant: Channel Enterprises (China) Limited, Hong Kong (HK)

(72) Inventor: Yuet Ming Chan, Hong Kong (HK)

(73) Assignee: CHANNEL ENTERPRISES (CHINA) LIMITED, Hong Kong (HK)

( * ) Notice: Subject to any disclaimer, the term of this patent is extended or adjusted under 35 U.S.C. 154(b) by 253 days.

(21) Appl. No.: 15/159,823

(22) Filed: May 20, 2016

(65) Prior Publication Data

US 2016/0344230 A1 Nov. 24, 2016

Related U.S. Application Data

(60) Provisional application No. 62/164,517, filed on May 20, 2015.

(30) Foreign Application Priority Data

May 4, 2016 (CN) .......................... 2016 1 0290888

(51) Int. Cl.
*H02J 7/00* (2006.01)

(52) U.S. Cl.
CPC ............ *H02J 7/007* (2013.01); *H02J 7/0047* (2013.01); *H02J 2007/0049* (2013.01); *H02J 2007/0096* (2013.01)

(58) Field of Classification Search
USPC ....................................................... 320/108
See application file for complete search history.

(56) References Cited

U.S. PATENT DOCUMENTS

2004/0196006 A1* 10/2004 Kawaguchi ........... H02J 7/0004
320/132
2013/0179061 A1* 7/2013 Gadh .................. B60L 11/1842
701/123

(Continued)

FOREIGN PATENT DOCUMENTS

| CN | 103346598 A | 10/2013 |
|---|---|---|
| CN | 103887832 A | 6/2014 |
| CN | 104079038 A | 10/2014 |

OTHER PUBLICATIONS

International Search Report of PCT Patent Application No. PCT/CN2016/082835 dated Aug. 26, 2016.

*Primary Examiner* — Robert Grant (57) ABSTRACT

A charging management apparatus, a charging apparatus, and a charging management method are disclosed. The charging management apparatus includes: a circuit board; a wireless communication module, connected to the circuit board and used to perform wireless communication with an intelligent terminal; and a current sensing module and/or a voltage sensing module, connected to the circuit board. The current sensing module is used to sense a charging current, and the voltage sensing module is used to sense a charging voltage. The charging apparatus includes the charging management module. The charging management method includes acquiring parameters of a charging apparatus and parameters of an intelligent terminal to be charged and correspondingly displaying the parameters; and issuing a prompt when a battery power of the charging apparatus and/or the intelligent terminal reaches a preset threshold.

20 Claims, 8 Drawing Sheets

(56) References Cited

U.S. PATENT DOCUMENTS

| | | | |
|---|---|---|---|
| 2014/0055087 A1* | 2/2014 | Causey | H02J 7/025 320/108 |
| 2014/0300321 A1* | 10/2014 | Kim | H02J 7/0004 320/111 |
| 2014/0361735 A1* | 12/2014 | Li | H02J 7/025 320/108 |
| 2015/0027178 A1* | 1/2015 | Scalisi | E05B 47/0001 70/277 |

* cited by examiner

CHARGING MANAGEMENT APPARATUS, CHARGING APPARATUS, AND CHARGING MANAGEMENT METHOD

CROSS-REFERENCE TO RELATED APPLICATIONS

The present application claims the benefit of U.S. Provisional Patent Application No. 62/164,517 filed May 20, 2015 and Chinese Patent Application No. 201610290888.6 filed on May 4, 2016, the entire content of which is hereby incorporated by reference.

BACKGROUND

Technical Field

The present invention relates to a charging device for charging a mobile terminal, and in particular, to a charging management apparatus, a charging apparatus and a charging management method.

Related Art

An intelligent terminal, for example, a smartphone, a tablet computer and the like, has become an indispensable device in the work and life of people. Intelligent terminals at present day have increasingly more functions which are accompanied by increasingly more power consumption, resulting in reduced battery duration. A mobile charging apparatus, for example, a portable power source, can charge an intelligent terminal in anywhere at anytime, and therefore is widely favored by customers. Existing mobile charging apparatuses generally only include a rechargeable battery component and a charging connector, and a user cannot know the condition of the mobile charging apparatus, which brings inconvenience to the user.

SUMMARY

According to one aspect, the present invention provides a charging management apparatus. In one embodiment of the charging management apparatus of the present invention, the charging management apparatus includes: a circuit board; a wireless communication module connected to the circuit board and used to perform wireless communication with an intelligent terminal; and a current sensing module and/or a voltage sensing module connected to the circuit board, wherein the current sensing module is used to sense a charging current and the voltage sensing module is used to sense a charging voltage.

In another embodiment according to the charging management apparatus of the present invention, the wireless communication module is a Bluetooth module, a near field communication module, or a WiFi module.

In another embodiment according to the charging management apparatus of the present invention, the charging management apparatus further includes a temperature sensing module used to sense a temperature of a charge cell.

In another embodiment according to the charging management apparatus of the present invention, the charging management apparatus further includes a remote control key connected to the circuit board and used to control the intelligent terminal to take photograph by using the wireless communication module.

In another embodiment according to the charging management apparatus of the present invention, when the charging management apparatus is far away from the intelligent terminal such that a signal strength of wireless communication between the charging management apparatus and the intelligent terminal is reduced to a preset value, the charging management apparatus or the intelligent terminal issues a prompt to a user.

In another embodiment according to the charging management apparatus of the present invention, the charging management apparatus sends position information of the charging management apparatus to the intelligent terminal by using the wireless communication module, and the intelligent terminal locates the charging management apparatus according to the position information.

In another embodiment according to the charging management apparatus of the present invention, when the charging management apparatus issues a searching instruction to the intelligent terminal by using the wireless communication module, the intelligent terminal issues a prompt to a user.

In another embodiment according to the charging management apparatus of the present invention, when the intelligent terminal issues a searching instruction to the charging management apparatus by using the wireless communication module, the charging management apparatus issues a prompt to a user.

In another embodiment according to the charging management apparatus of the present invention, the charging management apparatus sends a charging parameter to the intelligent terminal by using the wireless communication module, wherein the charging parameter includes one or more of following parameters: a capacity of a portable power source, a charging voltage, a charging current, a discharging voltage, a discharging current, time required for fully charging the intelligent terminal, number of times that the intelligent terminal can be fully charged, a health condition of the portable power source, and a temperature and a charge mode of the portable power source.

According to another aspect, the present invention further provides a charging apparatus, including the charging management apparatus as described above. The charging apparatus may be a portable power source, a travel charger, a car charger, a charger cable or a converter.

According to still another aspect, the present invention further provides a charging management method, including:

acquiring parameters of a charging apparatus and parameters of an intelligent terminal to be charged and correspondingly displaying the parameters;

issuing a prompt when a battery power of the charging apparatus and/or the intelligent terminal reaches a preset threshold;

determining whether the charging is in a rapid charge mode or a slow charge mode according to an output current of the charging apparatus or an input current of the intelligent terminal;

calculating a charging time according to the parameters of the charging apparatus and the parameters of the charged intelligent terminal and issuing a prompt when the intelligent terminal is fully charged;

acquiring and displaying a health condition of the charging apparatus;

acquiring and displaying a temperature of the charging apparatus and issuing a prompt when the temperature reaches a preset threshold;

issuing a prompt when the charging apparatus is far away from the intelligent terminal such that wireless communication between the charging apparatus and the intelligent terminal is disconnected;

issuing a switching off instruction to the charging apparatus to switch off the charging apparatus; and calculating and displaying the number of times that the charging apparatus is capable of fully charging the intelligent terminal according to the parameters of the charging apparatus and the parameters of the charged intelligent terminal.

The charging management apparatus, the charging apparatus and the charging management method of the present invention can conveniently acquire a charging condition and parameters and display the same to a user according to the settings, and can also prompt the user in time when a preset condition is reached, so as to facilitate convenience of the user and improve user experience.

BRIEF DESCRIPTION OF THE DRAWINGS

The present invention is further described with reference to drawings and embodiments in the following. In the drawings.

DETAILED DESCRIPTION

To more clearly understand the technical features, objectives and effects of the present invention, specific embodiments of the present invention are described in detail with reference to the drawings.

Embodiments of a charging management apparatus, a charging apparatus and a charging management method according to the present invention are described in detail in the following, and examples of these embodiments are shown in the drawings. The same or similar numeral references indicate the same or similar elements or elements having the same or similar functions throughout the drawings.

Figure 1:
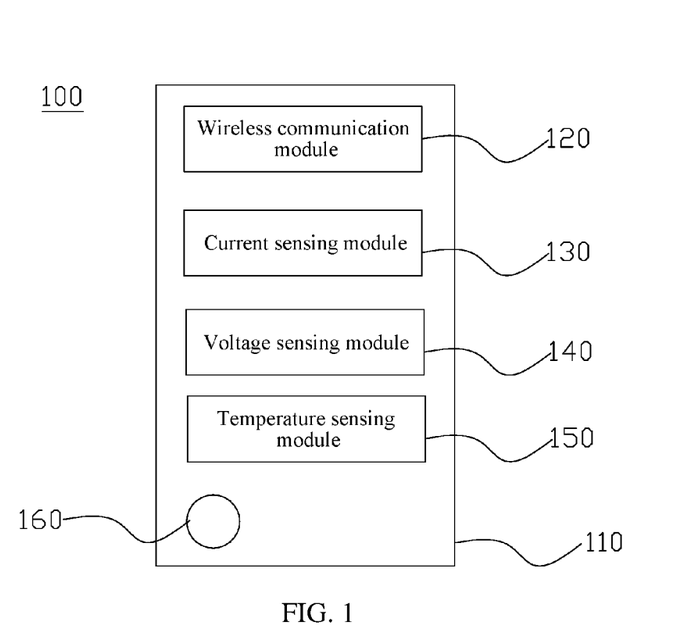
FIG. 1 is a schematic diagram of one embodiment of a charging management apparatus according to the present invention.
Figure 2:
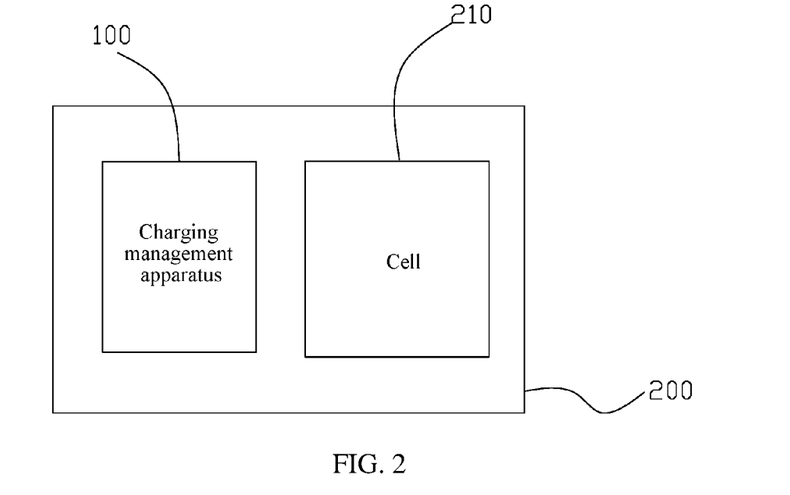
FIG. 2 is a schematic diagram of one embodiment of a charging apparatus according to the present invention.
Figure 3:
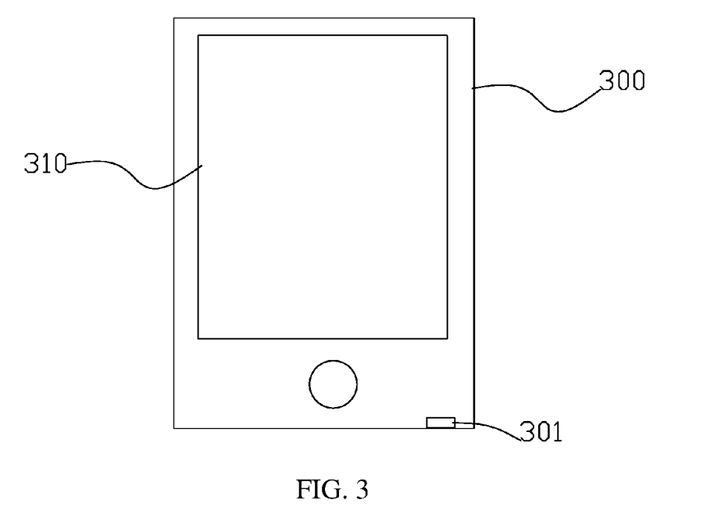
FIG. 3 is a schematic diagram of an intelligent terminal.

FIG. 1 is a schematic diagram of one embodiment of a charging management apparatus according to the present invention. Referring to FIG. 2, in this embodiment, a charging management apparatus 100 includes a circuit board 110, a wireless communication module 120 connected to the circuit board 110, a current sensing module 130 and/or a voltage sensing module 140, a temperature sensing module 150, and a remote control key 160. The circuit board 110 may be integrated with a control chip thereon, for example, a Microcontroller Unit (MCU), to control other parts to implement various functions. The wireless communication module 120 may be a Bluetooth module, a near field communication (NFC) module, a WiFi module or other module capable of implementing wireless communication. The wireless communication module 120 may be disposed on the circuit board 110 and may be used to perform wireless communication with an intelligent terminal, e.g. a device with a display screen capable of running an intelligent operating system, such as a mobile phone, a tablet computer and the like, to exchange data or control instructions. For example, the charging management apparatus may send a charging parameter to the intelligent terminal by using the wireless communication module, wherein the charging parameter includes one or more of following parameters: a capacity of a portable power source, a charging voltage, a charging current, a discharging voltage, a discharging current, time required for fully charging the intelligent terminal, number of times that the intelligent terminal can be fully charged, a health condition of the portable power source, and a temperature and a charge mode of the portable power source. FIG. 3 is a schematic diagram of an intelligent terminal 300, wherein the intelligent terminal 300 includes a display screen 310 and a charging interface 301, and the intelligent terminal 300 may run an intelligent operating system. The current sensing module 130 and the voltage sensing module 140 are separately connected to a charging circuit, to respectively acquire a charging current parameter and a charging voltage parameter, and may be various conventional and applicable current sensors and voltage sensors. The temperature sensing module 150 is used to sense a charging temperature, and in particular, a temperature of a charge cell of the portable power source. The temperature sensing module 150 may also be used to monitor a problem of an easily heated part of the charging apparatus or the charging management apparatus, to ensure that the charging apparatus or the charging management apparatus work safely and stably. The temperature sensing module 150 may be various conventional and applicable temperature sensors. In order to facilitate an operation on the intelligent device, the charging management apparatus 100 further includes a remote control key 160, wherein the remote control key 160 may be used to control the intelligent terminal to take photograph by using the wireless communication module 120. It should be understood that the temperature sensing module 150 and the remote control key 160 are not essential for the charging management apparatus 100, and may be configured according to function requirements of the charging management apparatus 100.

In another embodiment of the charging management apparatus according to the present invention, the wireless communication module 120 may be inbuilt with the current sensing module 130 and/or the voltage sensing module 140, and does not need a separate current sensing module 130 and/or voltage sensing module 140.

The charging management apparatus of the present invention may further possess an anti-loss function. When the charging management apparatus is far away from the intelligent terminal such that a signal strength of wireless communication between the charging management apparatus and the intelligent terminal is reduced to a preset value, the charging management apparatus or the intelligent terminal may issue a prompt to a user, wherein the prompt may be in a manner of screen display, sound, vibration, and the like. In addition, the charging management apparatus may also send position information of the charging management apparatus to the intelligent terminal by using the wireless communication module, and the intelligent terminal locates the charging management apparatus according to the position information. Besides, the charging management apparatus and the intelligent terminal can also implement a bidirectional or unidirectional searching function. For example, when the charging management apparatus issues a searching instruction to the intelligent terminal by using the wireless communication module, the intelligent terminal issues a prompt to the user. When the intelligent terminal issues a searching instruction to the charging management apparatus by using the wireless communication module, the charging management apparatus issues a prompt to the user.

FIG. 2 is a schematic diagram of one embodiment of a charging apparatus according to the present invention. Referring to FIG. 2, in this embodiment, a charging apparatus 200 may be a portable power source. A rechargeable battery includes a charge cell 210 and a charging management apparatus 100 integrated in the charging apparatus 200, wherein the charging management apparatus 100 may be the charging management apparatus 100 as shown in FIG. 1. It should be understood that the charging apparatus 100 is not limited to the foregoing portable power source and may also be in various other forms. For example, the charging apparatus may be a travel charger, a car charger, a charger cable, a converter, or the like, and the charging management apparatus 100 may be disposed on these charging apparatuses and used to manage the charging apparatuses.

The present invention further provides a charging management method, executed by an application (App) mounted on an intelligent terminal, wherein the charging management method includes:

acquiring parameters of a charging apparatus and parameters of an intelligent terminal to be charged and correspondingly displaying the parameters;

issuing a prompt when a battery power of the charging apparatus and/or the intelligent terminal reaches a preset threshold;

determining whether the charging is in a rapid charge mode or a slow charge mode according to an output current of the charging apparatus or an input current of the intelligent terminal;

calculating charging time according to the parameters of the charging apparatus and the parameters of the intelligent terminal to be charged and issuing a prompt when the intelligent terminal is fully charged;

acquiring and displaying a health condition of the charging apparatus;

acquiring and displaying a temperature of the charging apparatus and issuing a prompt when the temperature reaches a preset threshold;

issuing a prompt when the charging apparatus is far away from the intelligent terminal such that wireless communication between the charging apparatus and the intelligent terminal is disconnected;

issuing a switching off instruction to the charging apparatus to switch off the charging apparatus; and calculating and displaying the number of times that the charging apparatus is capable of fully charging the intelligent terminal according to the parameters of the charging apparatus and the parameters of the intelligent terminal to be charged.

Figure 4:
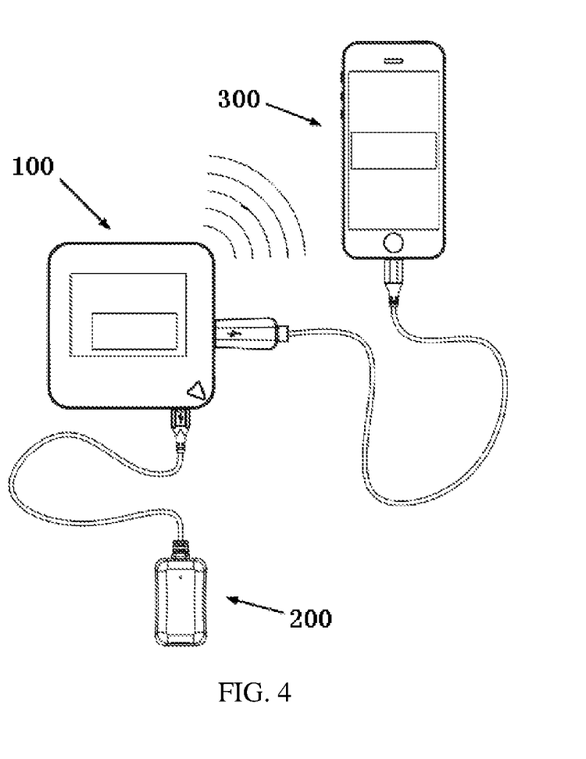
FIG. 4 is a schematic diagram in which a charging management apparatus, a power source and an intelligent terminal perform charging in a cooperative manner.
Figure 5:
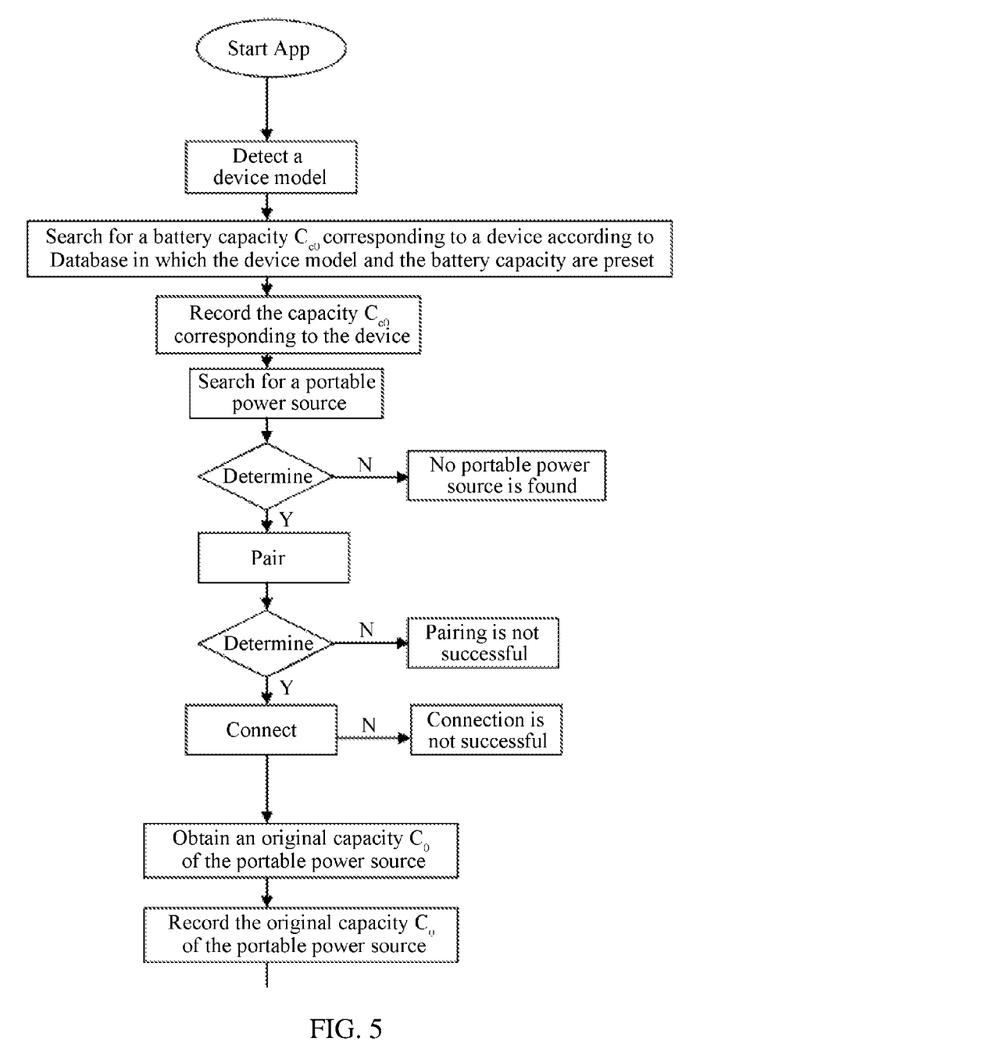
FIG. 5 is a schematic flowchart of the determination of a charging state of an input end of a charging apparatus according to the present invention.
Figure 6:
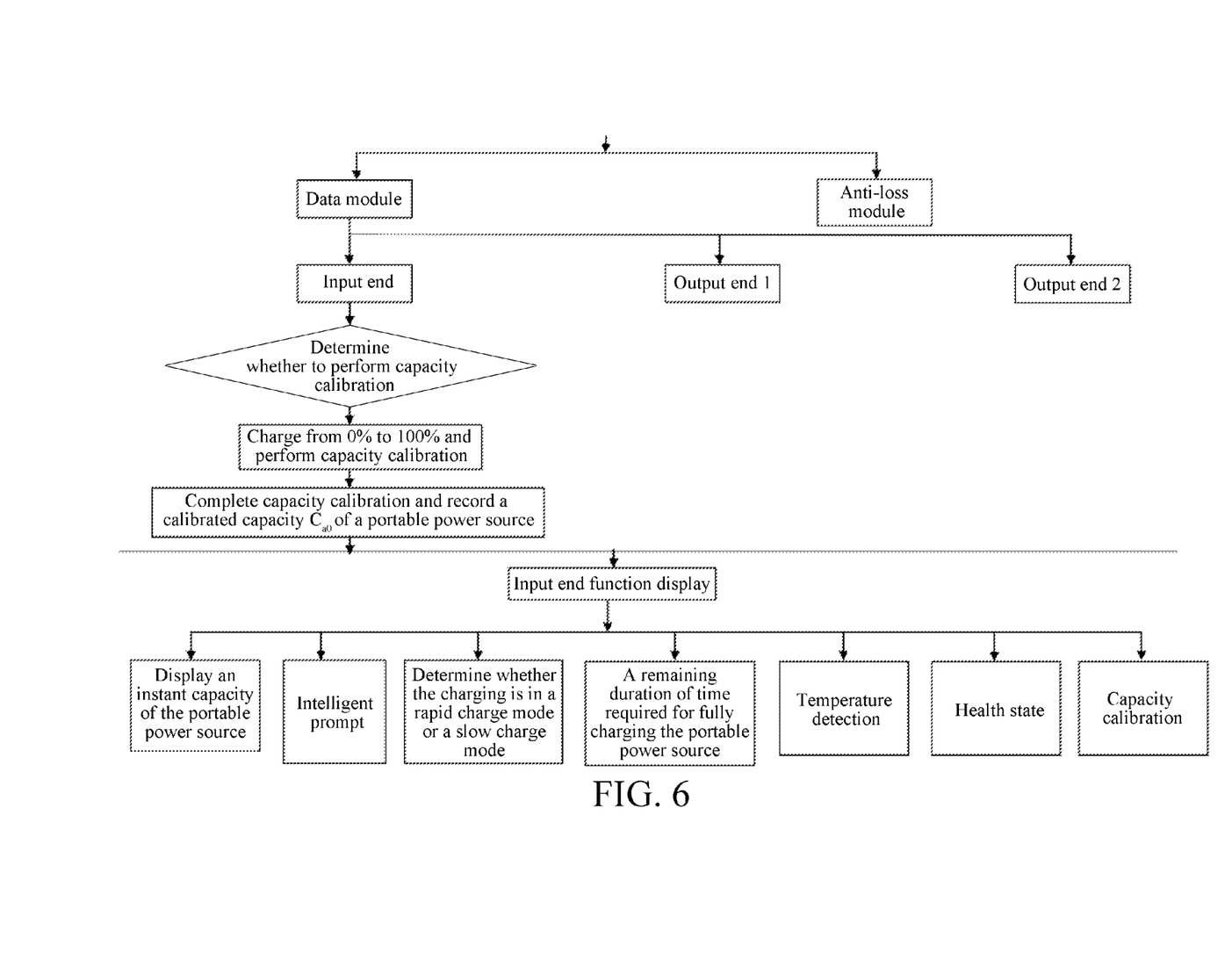
FIG. 6 is a continuing diagram of the schematic flowchart of FIG. 5.
Figure 7:
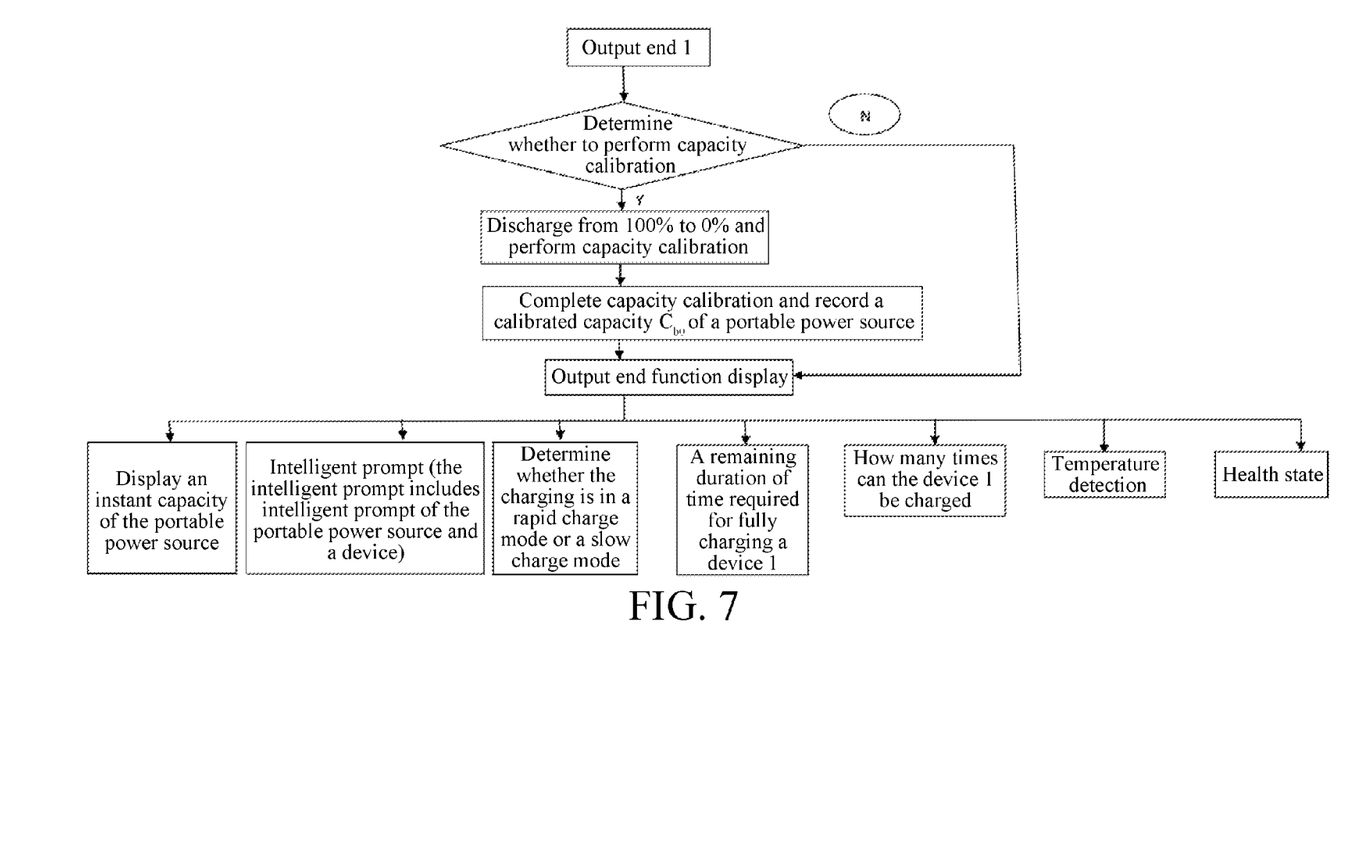
FIG. 7 is a schematic flowchart of the determination of a charging state of an output end of a charging apparatus according to the present invention.

FIG. 4 is a schematic diagram in which a charging management apparatus, a power source, and an intelligent terminal perform charging in a cooperative manner. The charging management apparatus 100 functions as a converter; one end thereof is connected to a power source 200 and the other end thereof is connected to the intelligent terminal 300 to charge the intelligent terminal 300; the power source 200 may be a portable power source or a power source input of any other forms; and the wireless communication module of the charging management apparatus 100 itself performs wireless communication with the intelligent terminal 300, to exchange data and control instructions.

How the charging management apparatus, the charging apparatus and the charging management method are run is described as follows.

Referring to FIG. 5 to FIG. 10, during use, the charging management apparatus 100 first needs to be paired with and connected to the intelligent terminal 300 to establish a wireless communication link. For example, Bluetooth and NFC need to be paired first. In the case of WiFi and other wireless modes, a wireless connection needs to be established. The wireless communication module 120 of the charging management apparatus 100 has multiple application configuration documents 2. The configuration documents 2 have different services 3 and parameters 4. The wireless communication module 120 performs communication with the charging management apparatus 100 according to instructions of the different services 3 and parameters 4 to obtain different data 5. The data 5 is then transmitted to an application (App) 6 on the intelligent terminal 300 by using the wireless communication module 120.

The Function of Informing the User

The user may set wish data in the application 6. The charging management apparatus 100 performs communication and obtains the data 5 by using the wireless communication module 120. When the data 5 becomes consistent with the wish data, the charging management apparatus 100 or the intelligent terminal 300 will inform the user in a manner of display, sound, vibration, and the like.

The Function of Prompting a Far-Distance Disconnection

When the charging management apparatus 100 is far away from the intelligent terminal 300 such that when a signal strength of the wireless communication between the charging management apparatus 100 and the intelligent terminal 300 is reduced to a preset value, e.g. when the charging management apparatus 100 and the intelligent terminal 300 are disconnected, the charging management apparatus 100 or the intelligent terminal 300 will notify a user in a manner of display, sound, vibration, and the like.

The capacity of the portable power source 200, the capacity of the intelligent terminal 300, the charging voltage, and the charging current The charging management apparatus 100 and the wireless communication module 120 perform communication and obtain the data 5, and the application 6 obtains and displays the data 5.

The Time Required for Fully Charging the Battery of the Intelligent Terminal 300

Battery capacity database of different intelligent terminals 300 and a relationship database containing a relationship between the battery capacity and the data 5 are preset in a database of the application 6. The charging management apparatus 100 acquires the model of the intelligent terminal 300 by using the wireless communication module 120. After the application 6 obtains the data 5, time required for fully charging is displayed according to data of the database.

The Number of Times that the Intelligent Terminal 300 can be Fully Charged

The battery capacity database of different intelligent terminals 300 is already preset in the database of the application 6. The application 6 obtains the data 5 of the battery power of the charging management apparatus 100, and application 6 calculates the number of times by using an equation and then displays the number of times.

The Health Condition of the Cell in the Portable Power Source 200

Under the circumstance where electricity is being input and output, the charging management apparatus 100 will perform communication and obtain the data 5 by using the wireless communication module 120. The relationship database of the data 5 is preset in the database of the application 6. After obtaining the data 5, the application 6 displays which data is in a good health condition, which data is in an average health condition, and which data is in a bad health condition.

Whether the Charging is in a Rapid Charge Mode or a Slow Charge Mode

The relationship database of the data 5 is already preset in the database of the application 6. With regard to which current data is in a rapid charge mode and which data is in a slow charge mode, an electronic line within the charging management apparatus 100 is designed to be able to monitor a charging current. Under the circumstance where electricity is being input and output, the charging management apparatus 100 will perform communication and obtain current data 5 by using the wireless communication module 120; and the application 6 displays whether the charging is in a rapid charge mode or a slow charge mode according to data in the database and the current data 5.

The Anti-Loss Function

Figure 8:
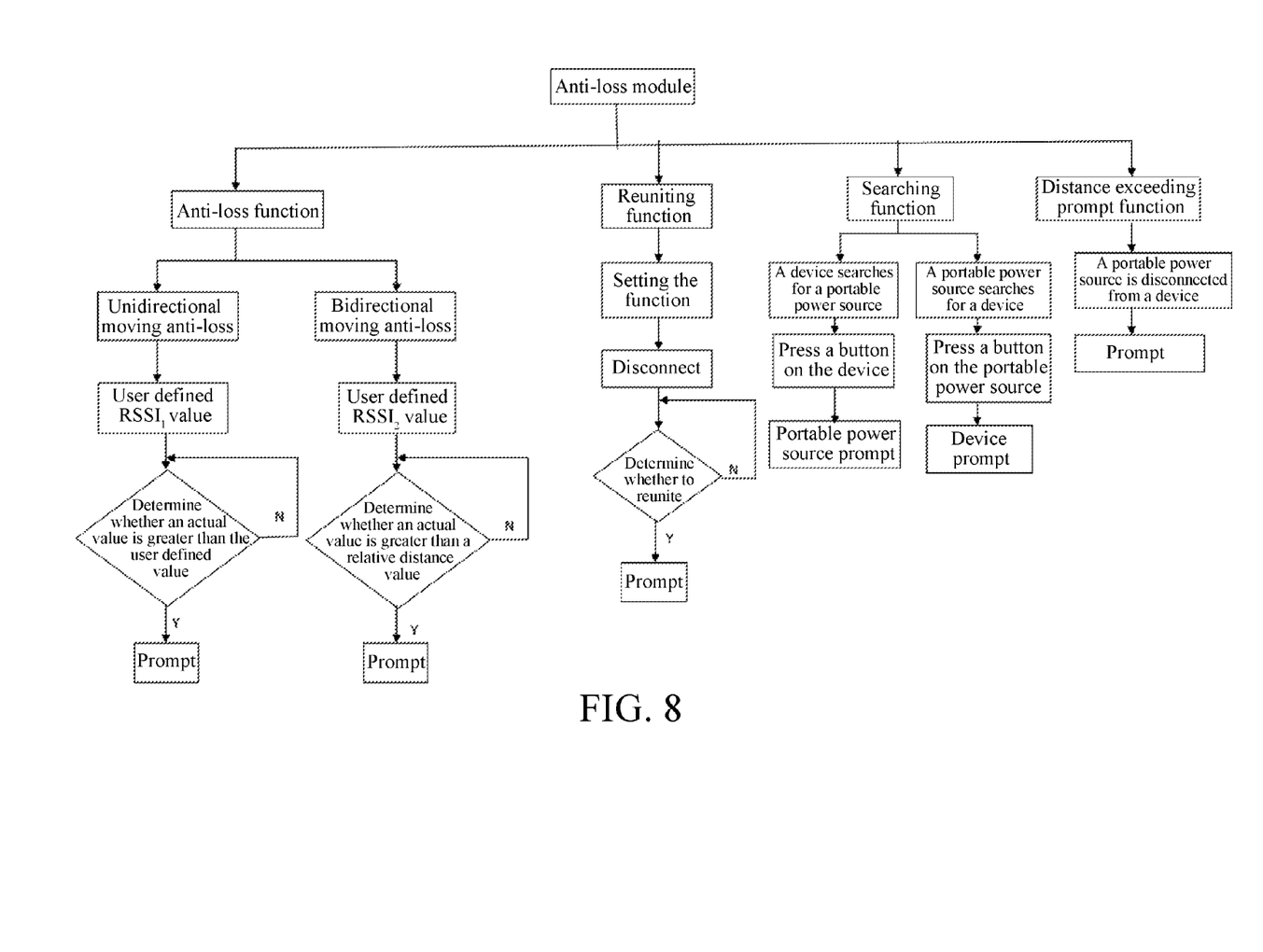
FIG. 8 is a schematic flowchart of an anti-loss function of a charging management apparatus according to the present invention.
Figure 9:
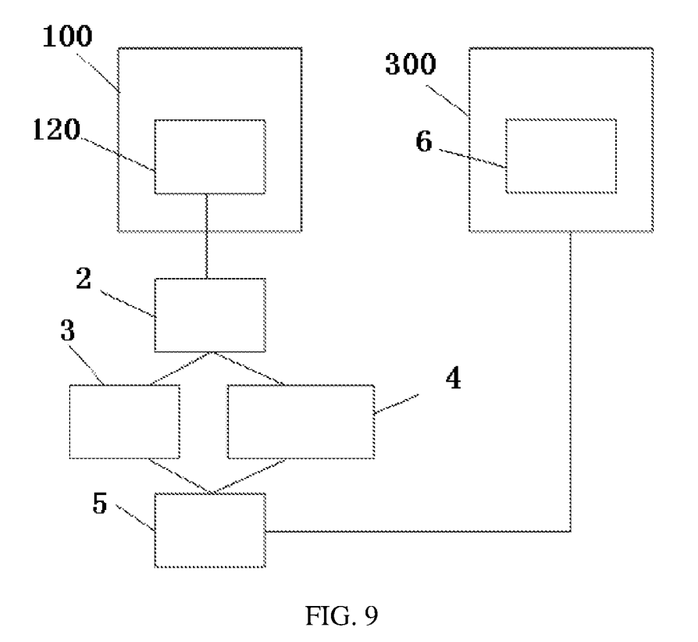
FIG. 9 is a schematic diagram, in which a charging management apparatus cooperate with an intelligent terminal, according to the present invention.
Figure 10:
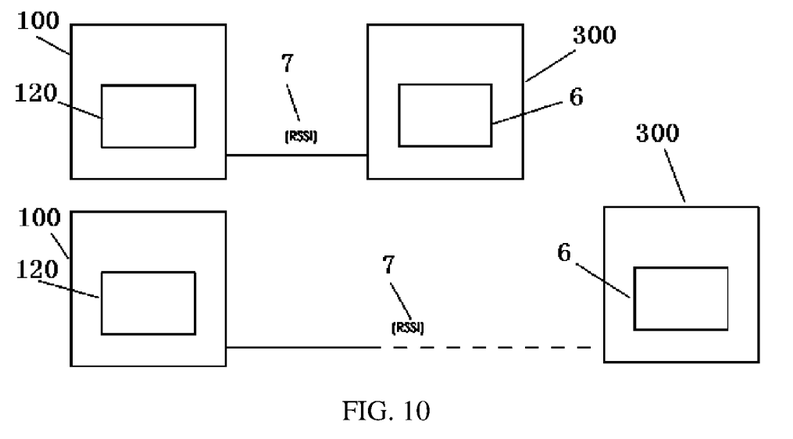
FIG. 10 is a principle schematic diagram of an anti-loss function of a charging management apparatus according to the present invention.

FIG. 10 and FIG. 8 describe how the anti-loss function is implemented.

1. The charging management apparatus 100 will perform communication and obtain data 7 by using the wireless communication module 120, wherein the data 7 is collectively referred to as RSSI.

2. Within a range of the anti-loss function, when the RSSI data 7 obtained by the application 6 changes (increases or decreases), the charging management apparatus 100 or the intelligent terminal 300 will inform the user in a manner of display, sound, vibration, and the like.

Condition I i. The user may set the data in the application 6.

ii. The charging management apparatus 100 will perform communication and obtain the data 7 by using the wireless communication module 120.

iii. When the data 7 becomes inconsistent with the data, the charging management apparatus 100 or the intelligent terminal 300 will inform the user in a manner of display, sound, vibration, and the like.

Condition II i. The user may set data range in the application 6.

ii. The charging management apparatus 100 will perform communication and obtain the data 7 by using the wireless communication module 120.

iii. When the data 7 exceeds the preset data range, the charging management apparatus 100 or the intelligent terminal 300 will inform the user in a manner of display, a sound, vibration, and the like.

Condition III i. After activating this function in the application 6, a user terminal apparatus and the charging management apparatus 100 may be disconnected.

ii. When the charging management apparatus 100 and the user terminal apparatus are re-connected, the charging management apparatus 100 will perform communication and obtain the data 7 by using the wireless communication module 120.

iii. The charging management apparatus 100 or the intelligent terminal 300 will notify the user in a manner of display, sound, vibration, and the like.

Condition IV i. The user clicks a button on the charging management apparatus 100 or the user terminal apparatus.

ii. The charging management apparatus 100 or the intelligent terminal 300 will notify a user in a manner of display, sound, vibration, and the like.

Condition V i. The charging management apparatus 100 and the user terminal apparatus are disconnected.

ii. The charging management apparatus 100 or the intelligent terminal 300 will notify a user in a manner of display, sound, vibration, and the like.

It should be understood that the foregoing charging management apparatus may be a charging management apparatus integrated in the charging apparatus, for example, a charging management apparatus integrated in the portable power source.

How the above data is calculated is described in detail according to the parameters in the table below.

TABLE 1 parameter table

| Description | Input end | Output end | Intelligent terminal |
|---|---|---|---|
| Number of single batteries | N | N | |
| Instant voltage of the single battery | $V_{a1}$ | $V_{b1}$ | |
| Voltage of the single battery at a constant Voltage | $V_{a2}$ | | |
| Input/output voltage of the portable power source | $V_{a3}$ | $V_{b3}$ | |
| Original capacity of the portable power source | $C_0$ | $C_0$ | |
| Original capacity of the single battery | $C_{00}$ | $C_{00}$ | |
| Calibrated capacity of the portable power source during charging/discharging | $C_{a0}$ | $C_{b0}$ | |
| Calibrated capacity of the single battery during charging/discharging | $C_{a00}$ | $C_{b00}$ | |
| Instant capacity of the single battery | $C_{a1}$ | | |
| Discharge capacity of the single battery | | $C_{b1}$ | |
| Total discharge capacity of the portable power source | | $C_{b2}$ | |
| Instant capacity of the portable power source | $C_{a2}$ | $C_{b3}$ | |
| Capacity of the single battery at the time it switches from a constant current to a constant voltage | $C_{a3}$ | | |
| Capacity of the portable power source at the time it switches from a constant current to a constant voltage | $C_{a4}$ | | |
| Rated power of the single battery | P | P | |
| Instant power of the single battery | $P_a$ | $P_b$ | |
| Instant capacity percentage value of the portable power source | $W_{a1}$ | $W_{b1}$ | |
| Capacity percentage value of the portable power source at the time it switches from a constant current to a constant voltage | $W_{a2}$ | | |
| Capacity percentage value of the portable power source at the beginning of the charging/discharging | $W_{a3}$ | $W_{b2}$ | |
| Capacity percentage value of the portable power source at the end of the charging/discharging | $W_{a4}$ | $W_{b3}$ | |
| Capacity percentage value segment during which the portable power source is being charged/discharged | $W_{a5}$ | $W_{b4}$ | |
| Input/output current of the single battery | $I_{a1}$ | $I_{b1}$ | |
| Input/output current of the portable power source | $I_{a2}$ | $I_{b2}$ | |
| Time point corresponding to $V_{a1}$ or $I_{a1}$ | $t_{a1}$ | $t_{b1}$ | |

TABLE 1-continued parameter table

| Description | Input end | Output end | Intelligent terminal |
|---|---|---|---|
| Time point at which the single battery is fully charged | $t_{a2}$ | | |
| Time segment during which the single battery is fully charged | $t_{a3}$ | | |
| Remaining duration of time required for fully charging the portable power source | $t_{a4}$ | | |
| Number of times that the portable power source can charge the device 1 | | Q | |
| Number of times for which the battery can be re-used | M | M | |
| Temperature during charging/discharging | $T_a$ | $T_b$ | |
| Energy conversion efficiency | | e | |
| Rated power of the device 1 | | | $P_c$ |
| Original capacity of the device 1 | | | $C_{c0}$ |
| Capacity received by the device 1 | | | $C_{c1}$ |
| Instant percentage value of capacity of a battery of the device 1 | | | $W_{c1}$ |

Data Theory of the Input End

I. Capacity Calibration

Method I:

1. The calibrated capacity $C_{a00}$ of the single battery during charging is obtained from a sum of $\Sigma I_{a1}*T_{a1}$.

2. The total calibrated capacity $C_{a0}$ of the portable power source is obtained from $C_{a0}=C_{a00}*N$.

Method II:

1. The single battery first reaches a constant current and then a constant voltage when being charged.

2. During the constant current, $I_{a1}$ is used to multiply the time segment T of the constant current to obtain the total capacity of the transverse flow segment (in this case, $I_{a1}$ is constantly the same).

3. During the constant voltage, the total capacity of the constant voltage segment is obtained by using a sum of $\Sigma I_{a1}*T_{a1}$ (in this case, $I_{a1}$ is varying).

4. The total capacity of the constant current segment is added to the total capacity of the constant voltage segment to obtain the calibrated capacity $C_{a00}$ of the single battery.

5. The calibrated capacity $C_{a00}$ of the portable power source is obtained from $C_{a00}*N=C_{a0}$.

II. Display of the Instant Capacity of the Portable Power Source (this Instant Capacity May be Displayed in a Form of a Specific Capacity Value or a Capacity Percentage)

Method I:

1. The instant power $P_a$ of the single battery is detected.

2. The instant capacity $C_{a2}$ of the portable power sources equals $(P_a/P)*C_{a0}$.

Method II:

1. The voltage $V_{a1}$ of the single battery is detected.

2. The magnitude relationship between $V_{a1}$ and $V_{a2}$ is determined.

3. A. If $V_{a1}<V_{a2}$, $C_{a1}$ corresponding to $V_{a1}$ is obtained according to the data table of the preset voltage and capacitor C of the single battery during charging.

B. If $V_{a1}=V_{a2}$, $I_{a1}$ is detected. $C_{a1}$ corresponding to $I_{a1}$ is obtained according to the data table of the preset current I and capacitor C of the single battery during charging.

4. The original capacity $C_0$ of the portable power source is known, and the original capacity $C_{00}$ of the single cell is known.

Therefore, the number of cells N is obtained from $N=C_0/C_{00}$.

5. The instant capacity $C_{a2}$ of the portable power source is obtained from $C_{a2}=C_{a1}*N$.

Method III:

1. The instant capacity percentage value $W_{a1}$ of the portable power source is obtained by using the Bluetooth.

2. The instant capacity $C_{a2}$ of the portable power source is obtained from $C_{a2}=W_{a4}*C_0$.

Method IV:

1. The input current $I_{a1}$ of the single battery is detected, and the time corresponding to this moment is recorded as $t_{a1}$.

2. The total capacity $C_{a2}$ of the instant portable power source is obtained from a value of $\Sigma I_{a1}*t_{a1}$.

III. Intelligent Prompt Function

Method I:

1. The instant power $P_a$ of the single battery is detected.

2. $W_{a1}=P_a/P$

3. Whether $W_{a1}$ reaches a capacity percentage value customized by the user to prompt reminder is determined.

4. When $W_{a1}$ reaches the capacity percentage value customized by the user to prompt reminder, the mobile phone may prompt in one or more manners of ringing, vibration, flashing, information prompt, and voice prompt.

Method II:

1. The voltage $V_{a1}$ of the single battery is detected.

2. The magnitude relationship between $V_{a1}$ and $V_{a2}$ is determined.

3. A. If $V_{a1}<V_{a2}$, $C_{a1}$ corresponding to $V_{a1}$ is obtained according to the data table of the preset voltage and capacitor C of the single battery during charging.

B. If $V_{a1}=V_{a2}$, $I_{a1}$ is detected. $C_{a1}$ corresponding to $I_{a1}$ is obtained according to the data table of the preset current I and capacitor C of the single battery during charging.

4. The capacity $C_0$ of the portable power source is known, and the capacity $C_{00}$ of the single cell is known.

Therefore, the number of cells N is obtained from $N=C_0/C_{00}$.

5. The instant capacity $C_{a2}$ of the portable power source is obtained from $C_{a2}=C_{a1}*N$.

6. The instant capacity percentage value $W_{a1}$ of the portable power source is obtained from $W_{a1}=C_{a2}/C_{a0}$.

7. Whether $W_{a1}$ reaches a capacity percentage value customized by the user to prompt reminder is determined.

8. When $W_{a1}$ reaches the capacity percentage value customized by the user to prompt reminder, the mobile phone may prompt in one or more manners of ringing, vibration, flashing, information prompt, or voice prompt.

Method III:

1. The instant capacity percentage value $W_{a1}$ of the portable power source is obtained by using the Bluetooth.

2. Whether $W_{a1}$ reaches a capacity percentage value customized by the user to prompt reminder is determined.

3. When $W_{a1}$ reaches the capacity percentage value customized by the user to prompt reminder, a mobile phone may prompt in one or more manners of ringing, vibration, flashing, information prompt, or voice prompt.

Method IV:

1. The input current $I_{a1}$ of the single battery is detected, and

2. The time corresponding to this moment is recorded as $t_{a1}$.

3. The instant total capacity $C_{a2}$ of the portable power source is obtained from a value of $\Sigma I_{a1}*t_{a1}$.

4. The instant capacity percentage value of the portable power source is obtained from $W_{a1}=C_{a2}/C_{a0}$.

5. Whether $W_{a1}$ reaches a capacity percentage value customized by the user to prompt reminder is determined.

6. When $W_{a1}$ reaches the capacity percentage value customized by the user to prompt reminder is determined, a mobile phone may prompt in one or more manners of ringing, vibration, flashing, information prompt, or voice prompt.

IV. Function of Detecting the Input Current of the Portable Power Source to Determine Whether the Charging is in a Rapid Charge Mode or a Slow Charge Mode 1. The capacity $C_{a3}$ of the single battery at the time it switches from a constant current to a constant voltage is obtained according to the data table of the preset voltage V and capacity C of the single battery during charging.

2. Thus, the capacity $C_{a4}$ of the portable power source at the time it switches from a constant current to a constant voltage is obtained from $C_{a4}=C_{a3}*N$.

3. The capacity percentage value of the portable power source at the time it switches from a constant current to a constant voltage is obtained from $C_{a4}/C_0=W_{a2}$.

4. Whether the instant battery power percentage value $W_{a1}$ of the portable power source is greater than $W_{a2}$ is determined.

5. A. If $W_{a1}>W_{a2}$, whether the input current $I_{a2}$ of the portable power source is greater than 500 mA is determined. If yes, the portable power source is in a rapid charge mode and is almost fully charged. Otherwise, the portable power source is in a slow charge mode and is also almost fully charged.

B. If $W_{a1}<W_{a2}$, whether the input current $I_{a2}$ of the portable power source is greater than 500 mA is determined. If yes, the portable power source is in a rapid charge mode. Otherwise, the portable power source is in a slow charge mode.

V. Function of Displaying the Remaining Duration of Time $T_{a4}$ Required for Fully Charging the Portable Power Source Method I:
1. The portable power source power equals $V_{a3}*I_{a2}$.
2. The battery power equals $(V_{a3}*I_{a2})/e$.
3. Work required for fully charging the battery equals $N(P-P_a)*t_{a4}$.
4. The remaining duration of time $t_{a4}$ required for fully charging the portable power source equals $(V_{a3}*I_{a2})/e*N(P-P_a)$.

Method II:
1. The instant voltage $V_{a1}$ of the single battery is detected.
2. A. If $V_{a1}<V_{a2}$, the time point $t_{a1}$ corresponding to $V_{a1}$ is obtained according to the data table of the preset voltage V and time t of the single battery during charging.
B. If $V_{a1}=V_{a2}$, $I_{a1}$ is detected. The time point $t_{a1}$ corresponding to $I_{a1}$ is obtained according to the data table of the preset current I and time t of the single battery during charging.
3. The time point at which the single battery is fully charged is known as $t_{a2}$.
Therefore, the time segment $t_{a3}$ required for fully charging the single cell equals $t_{a1}-t_{a2}$.
4. Thus, a value of the remaining duration of time $t_{a4}$ required for fully charging the portable power source is obtained from $t_{a4}=t_{a3}*N$.

Method III:
1. The instant current $I_{a1}$ of the portable power source is detected, the corresponding time $t_{a1}$ is recorded, and a capacity value can be obtained by using a sum of $\Sigma I_{a1}*t_{a1}$ to reversely obtain the value of $t_{a4}$.

VI. Function of Displaying the Health State $H_{a1}$ of the Portable Power source Method I:
1. $\Sigma P_a$ accumulates the instant power of the single battery.
2. $\Sigma P_a/P=M$ 3. When the M value is within 0 to 150, the health state of the portable power source is judged as "excellent".
When the M value is within 151 to 300, the health state of the portable power source is judged as "good".
When the M value is within 301 to 500, the health state of the portable power source is judged as "average".
When the M value is greater than 500, the health state of the portable power source is judged as "bad".

Method II:
1. The capacity percentage value $W_{a3}$ of the portable power source at the beginning of each charging is recorded.
2. The capacity percentage value $W_{a4}$ of the portable power source at the end of each charging is recorded.
3. The capacity percentage value segment $W_{a5}$ of the portable power source charged is obtained from $W_{a5}=W_{a4}-W_{a3}$.
4. A sum $\Sigma W_{a5}$ of the capacity percentage value segments of the portable power source charged is obtained by accumulating $W_{a5}$.
5. When the value of $\Sigma W_{a5}$ is within 1% to 15000%, the health state of the portable power source is judged as "excellent".
When the value of $\Sigma W_{a5}$ is within 15001% to 30000%, the health state of the portable power source is judged as "good".
When the value of $\Sigma W_{a5}$ is within 30001% to 50000%, the health state of the portable power source is judged as "average".
When the value of $\Sigma W_{a5}$ is greater than 50000%, the health state of the portable power source is judged as "bad".

Method III:
1. The capacity of the portable power source charged each time is accumulated to obtain the total capacity of accumulated charging.
2. The total capacity of accumulated charging divided by a calibrated capacity equals M.
3. When the M value is within 0 to 150, the health state of the portable power source is judged as "excellent".
When the M value is within 151 to 300, the health state of the portable power source is judged as "good".
When the M value is within 301 to 500, the health state of the portable power source is judged as "average".
When the M value is greater than 500, the health state of the portable power source is judged as "bad".

VI. Temperature Detection
1. The temperature $T_a$ is detected.
2. Whether $T_a$ is greater than 60° C. is determined.
3. If $T_a>60°$ C., operation stops. Otherwise, normal operation is performed.

Data Theory of the Output End

I. Display of the Instant Capacity of the Portable Power Source (the Instant Capacity is Displayed in a Form of a Specific Capacity Value or a Capacity Percentage Value)

Method I:
1. The instant power $P_b$ of the single battery is detected.
2. The instant capacity $C_{b3}$ of the portable power source equals $C_{b0}*(P_b/P)$.

Method II:
1. The instant voltage $V_{b1}$ of the single battery is detected.
2. $C_{b1}$ corresponding to $V_{b1}$ is obtained according to the data table of the preset voltage V and capacitor C of the single battery during discharging.
3. The total discharge capacity of the portable power source is obtained from $C_{b2}=C_{b1}*N$.
4. The instant capacity of the portable power source is obtained from $C_{b3}=C_{b0}-C_{b2}$.

Method III:

1. The instant capacity percentage value $W_{b1}$ of the portable power source is obtained by using the Bluetooth.

2. The instant capacity $C_{b3}$ of the portable power source is obtained from $C_{b3}=W_{b1}*C_{b0}$.

Method IV:

1. The output current $I_{b1}$ of the single battery is detected, and the time corresponding to this moment is recorded as $t_{a1}$.

2. The instant total discharge capacity $C_{b2}$ of the portable power source is obtained from a sum obtained by accumulating values of $I_{b1}*t_{b1}$.

3. The instant capacity of the portable power source is obtained from $C_{b3}=C_{b0}-C_{b2}$.

II. Intelligent Prompt

Intelligent Prompt of the Battery Power of the Mobile Phone

1. The battery power of the mobile phone $W_{c1}$ is detected.

2. Whether $W_{c1}$ reaches a capacity percentage value customized by the user to prompt reminder is determined.

3. When $W_{c1}$ reaches the capacity percentage value customized by the user to prompt reminder, a mobile phone may prompt in one or more manners of ringing, vibration, flashing, information prompt, or voice prompt.

Intelligent Prompt of the Portable Power Source

Method I:

1. The instant power $P_b$ of the single battery is detected.

2. $W_{b1}=P_b/P$

3. Whether $W_{b1}$ reaches a capacity percentage value customized by the user to prompt reminder is determined.

4. When $W_{b1}$ reaches the capacity percentage value customized by the user to prompt reminder, a mobile phone may prompt in one or more manners of ringing, vibration, flashing, information prompt, and voice prompt.

Method II:

1. The instant voltage $V_{b1}$ of the single battery is detected.

2. $C_{b1}$ corresponding to $V_{b1}$ is obtained according to the data table of the preset voltage V and capacitor C of the single battery during discharging.

3. The total discharge capacity of the portable power source is obtained from $C_{b2}=C_{b1}*N$.

4. The instant capacity of the portable power source is obtained from $C_{b3}=C_{b0}-C_{b2}$.

5. The instant capacity percentage value $W_{b1}$ of the portable power source is obtained from $W_{b1}=C_{b3}/C_{b0}$.

6. Whether $W_{b1}$ reaches the capacity percentage value customized by the user to prompt reminder is determined.

7. When $W_{b1}$ reaches the capacity percentage value customized by the user to prompt reminder, a mobile phone may prompt in one or more manners of ringing, vibration, flashing, information prompt, and voice prompt.

Method III:

1. The instant capacity percentage value $W_{b1}$ of the portable power source is obtained by using the Bluetooth.

2. Whether $W_{b1}$ reaches the capacity percentage value customized by the user to prompt reminder is determined.

3. When $W_{b1}$ reaches the capacity percentage value customized by the user to prompt reminder, the mobile phone may prompt in one or more manners of ringing, vibration, flashing, information prompt, and voice prompt.

Method IV:

1. The output current $I_{b1}$ of the single battery is detected, and the time corresponding to this moment is recorded as $t_{a1}$.

2. The instant total discharge capacity $C_{b2}$ of the portable power source is obtained from a sum obtained by accumulating values of $I_{b1}*t_{b1}$.

3. The instant capacity of the portable power source is obtained from $C_{b3}=C_{b0}-C_{b2}$.

4. The instant capacity percentage value $W_{b1}$ of the portable power source is obtained from $W_{b1}=C_{b3}/C_{b0}$.

5. Whether $W_{b1}$ reaches the capacity percentage value customized by the user to prompt reminder is determined.

6. When $W_{b1}$ reaches the capacity percentage value customized by the user to prompt reminder, the mobile phone may prompt in one or more manners of ringing, vibration, flashing, information prompt, and voice prompt.

III. Function of Detecting the Output Current of the Portable Power Source to Determine Whether the Charging is in a Rapid Charge Mode or a Slow Charge Mode 1. Whether the battery capacity $W_{c1}$ of the portable power source detection device 1 is greater than 90% is determined.

2. A. If $W_{c1}>90\%$, whether the output current $I_{b2}$ of the portable power source is greater than 500 mA is determined. If yes, the device 1 is in a rapid charge mode and is almost fully charged. Otherwise, the device 1 is in a slow charge mode and is also almost fully charged.

B. If $W_{c1}<90\%$, whether the output current $I_{b2}$ of the portable power source is greater than 500 mA is determined. If yes, the device 1 is in a rapid charge mode. Otherwise, the device 1 is in a slow charge mode.

IV. Remaining Duration of the Time Required for Fully Charging the Device 1

Method I:

1. The instant battery power percentage value $W_{c1}$ of the device 1 is detected.

2. Thus, the capacity that the portable power source needs to provide to the device 1 equals $(1-W_{c1})/e$.

3. Thus, the remaining duration of time required for fully charging the device 1 equals $(1-W_{c1})/e*I_{b1}$.

V. Function of Displaying the Number of Times that the Portable Power Source is Able to Charge a Device (this Calculation is Independently Calculated from the Instant Output End and is Specific to Devices Mounted with APPs)

Method I:

1. The instant power $P_b$ of the single battery is detected.

2. Thus, the power $N(P-P_b)$ is further needed to fully charge the portable power source.

3. Thus, the power that the device 1 can receive equals $e*N(P-P_b)$.

4. $Q=e*N(P-P_b)/P_c$

Method II:

1. The instant voltage $V_{b1}$ of the single battery is detected.

2. The capacity $C_{b1}$ corresponding to $V_{b1}$ is obtained according to the data table of the preset voltage V and capacitor C of the single battery during discharging.

3. The total discharge capacity $C_{b2}$ of the portable power source is obtained from $C_{b2}=C_{b1}*N$.

4. The instant capacity $C_{b3}$ of the portable power source is obtained from $C_{b3}=C_{b0}-C_{b2}$.

5. The capacity $C_{c1}$ received by the device 1 is obtained by multiplying the instant capacity $C_{b3}$ of the portable power source by an energy conversion efficiency e between the portable power source and the device 1 from $C_{c1}=C_{b3}*e$.

6. The number of times that the device can be charged is obtained from $Q=C_{c1}/C_{c0}$.

7. $V_{b1}$ is detected at specific interval of time to achieve an objective of obtaining a Q value at specific time Method III:

1. The instant capacity percentage value $W_{b1}$ of the portable power source is obtained by using the Bluetooth.

2. The instant capacity $C_{b3}$ of the portable power source is obtained from $C_{b3}=W_{b1}*C_{b0}$.

3. The capacity $C_{c1}$ received by the device 1 is obtained by multiplying the instant capacity $C_{b3}$ of the portable power source by an energy conversion efficiency e between the portable power source and the device 1 from $C_{c1}=C_{b3}*e$.

4. The number of times that the device can be charged is obtained from $Q=C_{c1}/C_{c0}$.

Method IV:

1. The output current $I_{b2}$ of the portable power source is detected, and the corresponding time is recorded as $t_{b1}$.

2. The instant total discharge capacity $C_{b2}$ of the portable power source is obtained by means of calculus.

3. $C_{b3}=C_{b0}-C_{b2}$

4. The capacity $C_{c1}$ received by the device 1 is obtained by multiplying the instant capacity $C_{b3}$ of the portable power source by an energy conversion efficiency e between the portable power source and the device 1 from $C_{c1}=C_{b3}*e$.

5. The number of times that the device can be charged is obtained from $Q=C_{c1}/C_{c0}$.

VI. Temperature Detection

1. The temperature $T_b$ of The portable power source is detected.

2. Whether $T_b$ is greater than 60 is determined. If yes, operation stops. Otherwise, normal operation is performed.

VII. Health State

Method I:

1. $\Sigma P_b$ is the accumulation of the instant power of the single battery.

2. $\Sigma P_b/P=M$

3. When the M value is within 0 to 150, the health state of the portable power source is judged as "excellent".

When the M value is within 151 to 300, the health state of the portable power source is judged as "good".

When the M value is within 301 to 500, the health state of the portable power source is judged as "average".

When the M value is greater than 500, the health state of the portable power source is judged as "bad".

Method II:

1. The capacity percentage value $W_{b2}$ of the portable power source at the beginning of the discharging is recorded.

2. The capacity percentage value $W_{b3}$ of the portable power source at the end of the discharging is recorded.

3. The capacity percentage value segment discharged by the portable power source is obtained from $W_{b4}=W_{b2}-W_{b3}$.

4. A sum of percentage value segments $\Sigma W_{b4}$ of the capacity discharged by the portable power source is obtained by accumulating $W_{b4}$.

5. When the value of $\Sigma W_{b4}$ is within 1% to 15000%, the health state of the portable power source is judged as "excellent".

When the value of $\Sigma W_{b4}$ is within 15001% to 30000%, the health state of the portable power source is judged as "good".

When the value of $\Sigma W_{b4}$ is within 30001% to 50000%, the health state of the portable power source is judged as "average".

When the value of $\Sigma W_{b4}$ is greater than 50000%, the health state of the portable power source is judged as "bad".

Method III:

1. The capacity of each discharge of the portable power source is accumulated to obtain the total capacity of accumulated discharge.

2. The total capacity of accumulated discharge total capacity divided by a calibrated capacity equals M.

3. When the M value is within 0 to 150, the health state of the portable power source is judged as "excellent".

When the M value is within 151 to 300, the health state of the portable power source is judged as "good".

When the M value is within 301 to 500, the health state of the portable power source is judged as "average".

When the M value is greater than 500, the health state of the portable power source is judged as "bad".

The above embodiments of the present invention are described with reference to the drawings. However, the present invention is not limited to the foregoing specific embodiments; the foregoing specific embodiments are merely exemplary and are not intended to be restrictive. Under the teaching of the present invention, person of ordinary skill in the art can also implement the present invention in many other forms without departing from the gist of the present invention and the scope of the claims, and these forms are all included within the protection of the present invention.

What is claimed is:

1. A charging apparatus, comprising a charging management apparatus and at least one rechargeable battery, the charging management apparatus comprising:
    a circuit board;
    a wireless communication module, connected to the circuit board and used to perform wireless communication with an intelligent terminal; and
    a current sensing module and/or a voltage sensing module, connected to the circuit board, wherein the current sensing module is used to sense a charging current, and the voltage sensing module is used to sense a charging voltage;
    wherein an input current $I_{a2}$ of the charging apparatus is detected to determine whether charging is in a rapid charge mode or a slow charge mode, the determination comprising:
        a capacity $C_{a3}$ of a single battery at a time the single battery switches from a constant current to a constant voltage is obtained according to a data table of voltage and capacity of the single battery during charging;
        a capacity $C_{a4}$ of the charging apparatus at a time the charging apparatus switches from a constant current to a constant voltage is obtained from $C_{a4}=C_{a3}*N$, where N is a number of the at least one rechargeable battery included in the charging apparatus;
        a capacity percentage value $W_{a2}$ of the charging apparatus at the time the charging apparatus switches from the constant current to the constant voltage is obtained from $W_{a2}=C_{a4}/C_0$, where $C_0$ is an original capacity of the charging apparatus;
        whether an instant battery power percentage value $W_{a1}$ of the charging apparatus is greater than $W_{a1}$ is determined;
        when $W_{a1}>W_{a2}$, whether the input current $I_{a2}$ of the charging apparatus is greater than a preset current value is determined; if yes, the charging apparatus is in the rapid charge mode and is almost fully charged; otherwise, the charging apparatus is in a slow charge mode and is almost fully charged;
        when $W_{a1}<W_{a2}$, whether the input current $I_{a2}$ of the charging apparatus is greater than the preset current value is determined; if yes, the charging apparatus is in the rapid charge mode; otherwise, the charging apparatus is in the slow charge mode.

2. The charging apparatus according to claim 1, wherein the wireless communication module is a Bluetooth module, a near field communication module, or a WiFi module.

3. The charging apparatus according to claim 1, further comprising a temperature sensing module, used to sense a temperature of a charge cell.

4. The charging apparatus according to claim 1, further comprising a remote control key connected to the circuit board and used to control the intelligent terminal to take photograph by using the wireless communication module.

5. The charging apparatus according to claim 1, wherein when the charging management apparatus is far away from the intelligent terminal such that a signal strength of the wireless communication between the charging management apparatus and the intelligent terminal is reduced to a preset value, the charging management apparatus or the intelligent terminal issues a prompt to a user.

6. The charging apparatus according to claim 1, wherein the charging management apparatus sends position information of the charging management apparatus to the intelligent terminal by using the wireless communication module, and the intelligent terminal locates the charging management apparatus according to the position information of the charging management apparatus.

7. The charging apparatus according to claim 1, wherein when the charging management apparatus issues a searching instruction for searching the intelligent terminal to the intelligent terminal by using the wireless communication module, the intelligent terminal issues a prompt to a user.

8. The charging apparatus according to claim 1, wherein when the intelligent terminal issues a searching instruction for searching the charging management apparatus to the charging management apparatus by using the wireless communication module, the charging management apparatus issues a prompt to a user.

9. The charging apparatus according to claim 1, wherein the charging management apparatus sends a charging parameter to the intelligent terminal by using the wireless communication module, wherein the charging parameter comprises one or more of following parameters: a capacity of the charging apparatus, a charging voltage, a charging current, a discharging voltage, a discharging current, time required for fully charging the intelligent terminal, number of times that the intelligent terminal can be fully charged, a health condition of the charging apparatus, and a temperature and a charge mode of the charging apparatus.

10. The charging apparatus according to claim 1, wherein the charging apparatus is a portable power source, a travel charger, a car charger, a charger cable, or a converter.

11. A charging management method, comprising:
acquiring parameters of a charging apparatus and parameters of an intelligent terminal to be charged and correspondingly displaying the parameters, the charging apparatus comprising a charging management apparatus and at least one rechargeable battery;
issuing a prompt when a battery power of the charging apparatus and/or the intelligent terminal reaches a preset threshold; and
detecting an input current $I_{a2}$ of the charging apparatus to determine whether charging is in a rapid charge mode or a slow charge mode, the determination comprising:
obtaining a capacity $C_{a3}$ of a single battery at a time the single battery switches from a constant current to a constant voltage according to a data table of voltage and capacity of the single battery during charging;
obtaining a capacity $C_{a4}$ of the charging apparatus at a time the charging apparatus switches from a constant current to a constant voltage from $C_{a4}=C_{a3}*N$, where N is a number of the at least one rechargeable battery included in the charging apparatus;
obtaining a capacity percentage value $W_{a2}$ of the charging apparatus at the time the charging apparatus switches from the constant current to the constant voltage from $W_{a2}=C_{a4}/C_0$, where $C_0$ is an original capacity of the charging apparatus;
determining whether an instant battery power percentage value $W_{a1}$ of the charging apparatus is greater than $W_{a2}$;
when $W_{a1}>W_{a2}$, determining whether the input current $I_{a2}$ of the charging apparatus is greater than a preset current value; if yes, the charging apparatus is in the rapid charge mode and is almost fully charged; otherwise, the charging apparatus is in a slow charge mode and is almost fully charged;
when $W_{a1}<W_{a2}$, determining whether the input current $I_{a2}$ of the charging apparatus is greater than the preset current value; if yes, the charging apparatus is in the rapid charge mode; otherwise, the charging apparatus is in the slow charge mode.

12. The charging management method according to claim 11, further comprising:
calculating a charging time according to the parameters of the charging apparatus and the parameters of the intelligent terminal to be charged and issuing a prompt when the intelligent terminal is fully charged.

13. The charging management method according to claim 11, further comprising:
acquiring and displaying a health condition of the charging apparatus.

14. The charging management method according to claim 11, further comprising:
acquiring and displaying a temperature of the charging apparatus and issuing a prompt when the temperature reaches a preset threshold.

15. The charging management method according to claim 11, further comprising:
issuing a prompt when the charging apparatus is far away from the intelligent terminal such that wireless communication between the charging apparatus and the intelligent terminal is disconnected.

16. The charging management method according to claim 11, further comprising:
issuing a switching off instruction to the charging apparatus to switch off the charging apparatus.

17. The charging apparatus according to claim 1, wherein an instant capacity $C_{a2}$ of the charging apparatus is obtained by following process:
an instant voltage $V_{a1}$ of the single battery is detected;
a magnitude relationship between $V_{a1}$ and $V_{a2}$ is determined, where $V_{a2}$ is a voltage of the single battery at a constant voltage;
when $V_{a1}<V_{a2}$, an instant capacity $C_{a1}$ of the single battery is obtained according to the data table of voltage and capacity of the single battery during charging;
when $V_{a1}=V_{a2}$, $I_{a1}$ is detected, where $I_{a1}$ is an input current of the single battery; the instant capacity $C_{a1}$ of the single battery is obtained according to a data table of current and capacitor of the single battery during charging;
the instant capacity $C_{a2}$ of the charging apparatus is obtained from $C_{a2}=C_{a1}*N$.

18. The charging apparatus according to claim 17, wherein when $W_{a1}$ reaches a capacity percentage value customized by a user to prompt reminder, the intelligent terminal prompts the reminder in one or more manners of ringing, vibration, flashing, information prompt, or voice prompt, where $W_{a1}$ is obtained from $W_{a1}=C_{a2}/C_{a0}$, where $C_{a0}$ is a calibrated capacity of the charging apparatus during charging obtained from $C_{a0}=C_{a00}*N$, where $C_{a00}$ is a calibrated capacity of the single battery during charging obtained from a sum of $\Sigma I_{a1}*T_{a1}$, where $T_{a1}$ is a time point corresponding to $I_{a1}$.

19. The charging apparatus according to claim 9, wherein an instant power $P_a$ of the single battery is accumulated;

a M value is obtained from $\Sigma P_a/P=M$, where P is a rated power of the single battery;

when the M value is within 0 to 150, the health condition of the charging apparatus is judged as "excellent";

when the M value is within 151 to 300, the health condition of the charging apparatus is judged as "good";

when the M value is within 301 to 500, the health condition of the charging apparatus is judged as "average";

when the M value is greater than 500, the health condition of the charging apparatus is judged as "bad".

20. The charging apparatus according to claim 9, wherein a capacity percentage value $W_{a3}$ of the charging apparatus at a beginning of each charging is recorded;

a capacity percentage value $W_{a4}$ of the charging apparatus at an end of each charging is recorded;

a capacity percentage value segment $W_{a5}$ of the charging apparatus charged is obtained from $W_{a5}=W_{a4}-W_{a3}$;

a sum $\Sigma W_{a5}$ of the capacity percentage value segments of the charging apparatus charged is obtained by accumulating $W_{a5}$;

when the value of $\Sigma W_{a5}$ is within 1% to 15000%, the health condition of the charging apparatus is judged as "excellent";

when the value of $\Sigma W_{a5}$ is within 15001% to 30000%, the health condition of the charging apparatus is judged as "good";

when the value of $\Sigma W_{a5}$ is within 30001% to 50000%, the health condition of the charging apparatus is judged as "average";

when the value of $\Sigma W_{a5}$ is greater than 50000%, the health condition of the charging apparatus is judged as "bad".

* * * * *